US012340676B2

(12) United States Patent
Sharma et al.

(10) Patent No.: US 12,340,676 B2
(45) Date of Patent: Jun. 24, 2025

(54) AI BASED SYSTEM AND METHOD FOR GENERATING WARNING ALERTS FOR A LOCATION TO BE EXCAVATED

(71) Applicant: Zensar Technologies Limited, Maharashtra (IN)

(72) Inventors: Annapurna Sharma, Maharashtra (IN); Maheshakumara Shivakumara, Maharashtra (IN); Phanindra Reddy Vedikola, Maharashtra (IN); Puneet Agarwal, Maharashtra (IN); Sumant Kulkarni, Maharashtra (IN); Saurabh Bobde, Maharashtra (IN); Sakshi Goyal, Maharashtra (IN)

(73) Assignee: ZENSAR TECHNOLOGIES LIMITED, Maharashtra (IN)

( * ) Notice: Subject to any disclaimer, the term of this patent is extended or adjusted under 35 U.S.C. 154(b) by 118 days.

(21) Appl. No.: 18/457,846

(22) Filed: Aug. 29, 2023

(65) Prior Publication Data

US 2024/0071199 A1 Feb. 29, 2024

(30) Foreign Application Priority Data

Aug. 30, 2022 (IN) .............................. 202221049659

(51) Int. Cl.
*G08B 21/18* (2006.01)
*G06F 40/279* (2020.01)
(Continued)

(52) U.S. Cl.
CPC ........... *G08B 21/18* (2013.01); *G06F 40/279* (2020.01); *G06N 20/00* (2019.01); *G06V 10/762* (2022.01); *G06V 30/413* (2022.01); *G06V 30/422* (2022.01)

(58) Field of Classification Search
CPC ....................................................... G08B 21/18
See application file for complete search history.

(56) References Cited

U.S. PATENT DOCUMENTS

| 5,631,970 A * | 5/1997 | Hsu ...................... G06V 30/422 |
| | | 382/113 |
| 6,751,553 B2 * | 6/2004 | Young .................. G01V 11/002 |
| | | 342/22 |

(Continued)

FOREIGN PATENT DOCUMENTS

WO  2008005837 A2  1/2008

OTHER PUBLICATIONS

Oguntoye et al., "Review of Artificial Intelligence Applications for Virtual Sensing of Underground Utilities", Sensors 2023, 23, 4367 (15 pages).

(Continued)

*Primary Examiner* — Travis R Hunnings
(74) *Attorney, Agent, or Firm* — HSML P.C.

(57) ABSTRACT

Disclosed herein is an AI based system and method for generating warning alerts for a location to be excavated. The method comprises obtaining, from at least one external source, at least one underground asset map of the location to be excavated. For each of the at least one underground asset map, the method comprises locating a region of interest within the underground asset map corresponding to an identified underground utility service provider and extracting at least one feature within the region of interest. The at least one extracted feature is then compared with a plurality of features stored in a repository corresponding to the identified underground utility service provider, to determine a match. In response to the determination, the extracted feature is identified as a risk feature corresponding to the (Continued)

identified underground utility service provider and one or more warning alerts indicative of risk assets are generated.

15 Claims, 4 Drawing Sheets

(51) Int. Cl.
    *G06N 20/00*     (2019.01)
    *G06V 10/762*     (2022.01)
    *G06V 30/413*     (2022.01)
    *G06V 30/422*     (2022.01)

(56) References Cited

U.S. PATENT DOCUMENTS

| | | |
|---|---|---|
| 8,270,666 B2 | 9/2012 | Nielsen et al. |
| 9,360,588 B2 * | 6/2016 | Young .................. G01V 11/00 |
| 9,465,129 B1 | 10/2016 | Olsson et al. |
| 10,895,637 B1 * | 1/2021 | Padmanabhan ......... G01S 19/14 |
| 2008/0079723 A1 * | 4/2008 | Hanson .................. G06T 17/05 |
| | | 345/419 |

OTHER PUBLICATIONS

Underground Utility Locating and Mapping, 2023 (4 pages).

* cited by examiner

AI BASED SYSTEM AND METHOD FOR GENERATING WARNING ALERTS FOR A LOCATION TO BE EXCAVATED

TECHNICAL FIELD

The present application claims priority from Indian provisional patent application number 202221049659 which is filed on 30 Aug. 2022.

The present subject matter described herein, in general, indicates issuing warnings alerts for a location to be excavated.

BACKGROUND OF THE INVENTION

The following description includes information that may be useful in understanding the present invention. It is not an admission that any of the information provided herein is prior art or relevant to the presently claimed invention, or that any publication specifically or implicitly referenced is prior art.

In any part of the world, installation, repair and maintenance of underground assets are regular activities that various utility service providers perform on a day-to-day basis. These underground assets include, but not limited to, electric power lines, telephone lines, water lines, sewer lines, fiber-optic cable lines, natural gas transmission lines, natural gas distribution lines, and utility lines for transporting hazardous liquids. These underground assets are owned by respective utility service providers which are utility services distribution agencies including gas, electricity, telecom network and water. While performing above activities, managing the underground assets requires almost care as it may not only affect disruption and continuity of services but also puts human life in danger, if in case field workers/field engineers accidentally hit substantial risk assets like electricity and gas pipelines. Thus, to carry out any excavation activity, the utility service providers must ensure the exact location and type of assets present underneath before initiating the excavation at such location.

Though various techniques have been tested to mitigate various difficulties mentioned in the situation above for e.g., when earth mining equipment[s] is/are used for the excavation activity, no single technique ensures complete safety and protection of the underground assets by providing a completely end-to-end automation solution.

SUMMARY OF THE INVENTION

The following presents a simplified summary to provide a basic understanding of some aspects of the disclosed artificial intelligence (AI) based system and method for generating warning alerts for a location to be excavated. This summary is not an extensive overview and is intended to neither identify key or critical elements nor delineate the scope of such elements. Its purpose is to present some concepts of the described features in a simplified form as a prelude to the more detailed description that is presented later.

In another non-limiting embodiment of the present disclosure, an artificial intelligence (AI) based method for generating warning alerts for a location to be excavated, is disclosed. The method comprises obtaining, from at least one external source, at least one underground asset map, wherein an underground asset map corresponds to an underground asset at the location to be excavated. The method further comprises analyzing each of the at least one underground asset map using a pre-trained AI model. For each of the at least one underground asset map, analyzing each of the at least one underground asset map comprises identifying, performing a text-based analysis on a text area of the underground asset map, a name of a service provider providing underground service corresponding to the underground asset and locating a region of interest within the underground asset map. The region of interest corresponds to a specific area within the location to be excavated. Analyzing each of the at least one underground asset map further comprises extracting at least one feature within the region of interest of the underground asset map. Analyzing each of the at least one underground asset map further comprises comparing the at least one extracted feature with a plurality of features stored in a repository to determine a match, wherein each of the plurality of features indicate a risk associated with the underground asset corresponding to the identified service provider. In response to the determination of the match, the method recites classifying the extracted feature as a risk feature corresponding to underground risk assets of the identified underground utility service provider. The method further comprises generating one or more warning alerts based on the result of classification. The one or more warnings alerts represents presence of one or more risks within the region of interest of each of the at least one underground asset map.

In another non-limiting embodiment of the present disclosure, an AI based system for generating warning alerts for a location to be excavated, is disclosed. The system comprises a processor and an AI based map processing modelling unit coupled to the processor. The processor obtains, from at least one external sources, at least one underground asset map, wherein an underground asset map corresponds to an underground asset at the location to be excavated. The AI based map processing modeling unit analyzes each of the at least one underground asset map, wherein to analyze each of the at least one underground asset map, the AI based map processing modelling unit further comprises a text analysis modelling unit that identifies, by performing a text-based analysis on a text area of the underground asset map, a name of a service provider providing underground service corresponding to the underground asset. The AI based map processing modelling unit further comprises a warning detection modelling unit locates a region of interest within the underground asset map. The region of interest corresponds to a specific area within the location to be excavated. The warning detection modelling unit further extracts at least one feature within the located region of interest of the underground asset map and compares the at least one extracted feature with a plurality of features stored in a repository to determine a match. The plurality of features indicates a risk associated with the underground asset corresponding to the identified service provider. In response to the determination of the match, the warning detection modelling unit classifies the extracted feature as a risk feature corresponding to the identified underground utility service provider. Further, the warning detection modelling unit generates one or more warning alerts based on the result of classification. The one or more warning alerts represents presence of one or more risks within the region of interest of the each of the at least one underground asset map.

The above summary is provided merely for purposes of summarizing some example embodiments to provide a basic understanding of some aspects of the disclosure. Accordingly, it will be appreciated that the above-described embodiments are merely examples and should not be construed to narrow the scope of the disclosure in any way. It will be appreciated that the scope of the disclosure encompasses many potential embodiments in addition to those here summarized, some of which will be further described below.

BRIEF DESCRIPTION OF THE DRAWINGS

The accompanying drawings, which are incorporated in and constitute a part of this disclosure, illustrate exemplary embodiments and, together with the description, explain the disclosed principles.

DETAILED DESCRIPTION

Figure 1:
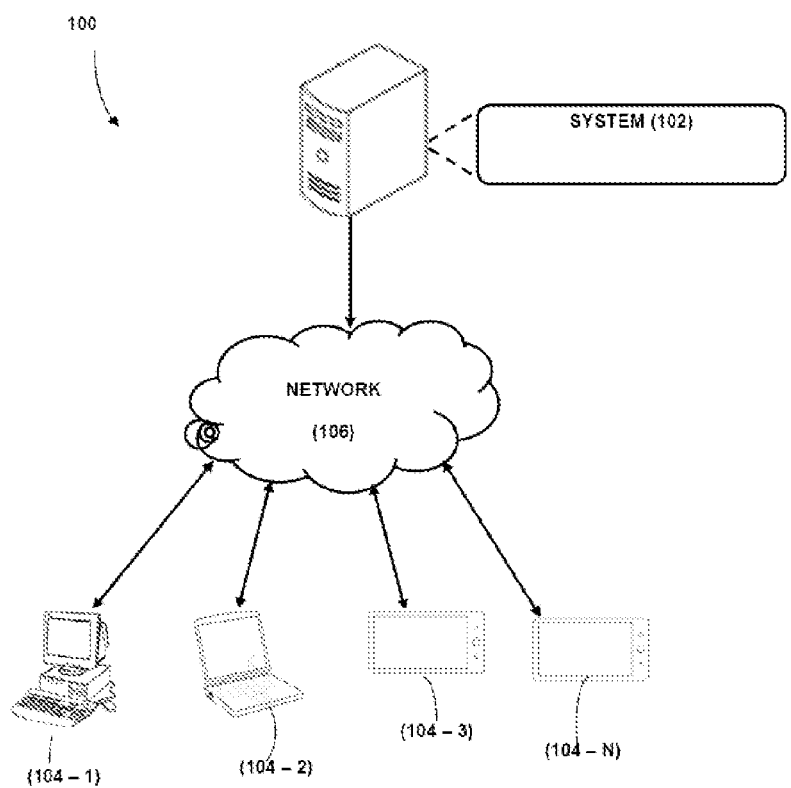
FIG. 1 illustrates a network implementation of an AI enabled system for generating warning alerts for a location to be excavated, in accordance with an embodiment of the present disclosure.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims. Additional illustrative embodiments are listed below.

Various embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

Throughout this specification, the term "system" or "AI enabled system" may be used interchangeably. Similarly, the terms "method" or "AI based method" may be used interchangeably, the term "map", "at least one underground asset map", "the underground asset map" may be used interchangeably, the term "bundled report" and 'pack' may be used interchangeably. These terms shall not be taken in a sense to limit the scope of the present disclosure.

To carry out any excavation activity for installation/repair/maintenance of underground assets, excavators or an excavation team need to know what assets of utility services are present beneath the location identified to be excavated. In an example without limitation, the excavators or excavation team are a set of people including field engineers and/or field workers performing the excavation work. In another example without limitation, the excavators or excavation team may be employed by an excavation job agency or excavation contractors.

Information about the underground assets is usually captured by placing a request for underground asset maps of the utility service providers in the location and getting access to the underground asset maps with given location coordinates. However, in the currently existing processes, after said maps are received, significant manual/human efforts have to be made for checking and highlighting the presence of any high-risk assets which are, but not limited thereto, high pressure gas pipeline and high voltage electricity cable. Thus, the currently existing processes fail to accurately highlight the high-risk assets/warning elements captured in the underground asset maps. Moreover, the currently existing processes relies on paper maps/printouts/zip files of the underground asset maps which are being shared with the field engineers/excavation team. However, such files and maps do not have any means to track if the field engineers have spent the time to visualize the information present on said files and maps, as a part of process adherence.

The present disclosure overcomes at least the above limitation(s) by providing an artificial intelligence (AI) based system that generates warning alerts for the location identified, which is described in greater detail in the forthcoming paragraphs.

Referring now to FIG. 1, a network implementation 100 of an AI enabled system 102 for generating warnings alerts for a location to be excavated is disclosed. Although the present disclosure is explained considering that the system 102 is implemented on a server, it may be understood that the system 102 may be implemented in a variety of computing systems, such as a laptop computer, a desktop computer, a notebook, a workstation, a mainframe computer, a server, a network server, a cloud-based computing environment. It will be understood that the system 102 may be accessed by multiple users through one or more user devices 104-1, 104-2 . . . 104-N, collectively referred to as user 104 or stakeholders, hereinafter, or applications residing on the user devices 104. In one implementation, the AI enabled system 102 may comprise the cloud-based computing environment in which a user may operate individual computing systems configured to execute remotely located applications. Examples of the user devices 104 may include, but are not limited to, an IoT device, IoT gateway, portable computer, a personal digital assistant, a handheld device, and a workstation. The user devices 104 are communicatively coupled to the system 102 through a network 106 to receive one or more underground asset maps and warnings alerts for the location to be excavated.

In one implementation, the network 106 may be a wireless network, a wired network or a combination thereof. The network 106 can be implemented as one of the different types of networks, such as intranet, local area network (LAN), wide area network (WAN), the internet, and the like.

The network 106 may either be a dedicated network or a shared network. The shared network represents an association of the different types of networks that use a variety of protocols, for example, Hypertext Transfer Protocol (HTTP), Hypertext Transfer Protocol Secure (HTTPS), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
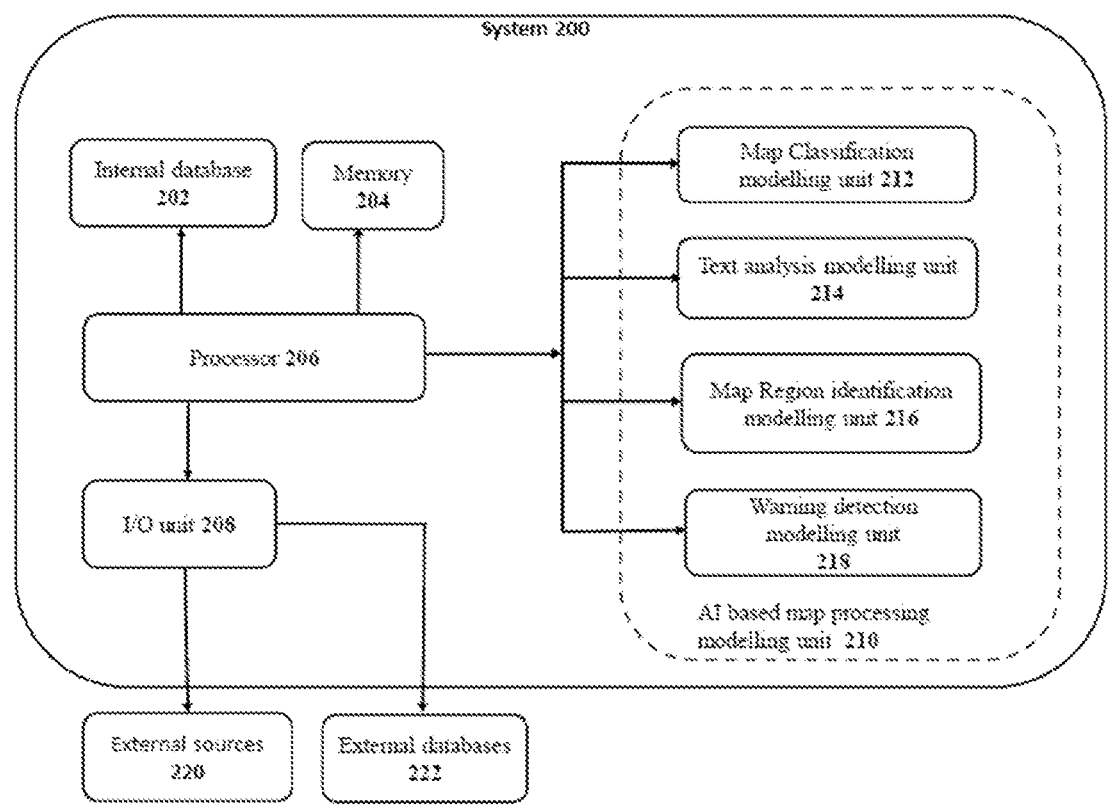
FIG. 2 illustrates a block diagram of an AI enabled system for generating warning alerts for a location to be excavated, in accordance with some embodiments of the present disclosure.

FIG. 2 illustrates a block diagram of an AI enabled system for generating warning alerts for a location to be excavated, in accordance with some embodiments of the present disclosure. In one embodiment, the AI enabled system 200 may include an internal database or repository 202, a memory 204, a processor 206, input/output (I/O) unit 208, an AI based map processing modelling unit 210. The internal database or repository 202 may include a plurality of images for each kind of warning to be detected for each of the at least one utility service provider. The AI based map processing modeling unit 210 may include a map classification modelling unit 212, a text analysis modelling unit 214, a map region identification modelling unit 216 and a warning detection modeling unit 218. The processor 206 may be implemented as one or more microprocessors, microcomputers, microcontrollers, digital signal processors, central processing units, state machines, logic circuitries, and/or any devices that manipulate signals based on operational instructions. Among other capabilities, the processor 206 is configured to fetch and execute computer-readable instructions stored in the memory 204. It may be worth noting that the processor 206 is in communication with each of the above-mentioned units 212, 214, 216, 218, 220 to perform the functions described in the paragraphs below. In one non-limiting embodiment, the processor 206 implements one or Robotic process automation (RPA) bots to perform one or more functions of the present disclosure.

The memory 204 may include any computer-readable medium or computer program product known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, data/information may be stored within the memory 204 in the form of various data structures. The memory 204 may also store other data such as temporary data and temporary files, generated by the processor 206 for performing the various functions of the present invention.

According to an embodiment of the present disclosure, the above discussed units 212, 214, 216, 218, 220 of the AI based map processing modelling unit 210 may be dedicated hardware units capable of executing one or more instructions stored in the memory 204 for performing various operations of the AI enabled system 102. In another embodiment, the units 212, 214, 216, 218, 220 may be software modules stored in the memory 204 which may be executed by the processor 206 for performing the operations of the AI enabled system 200.

The I/O unit 208 may include a variety of software and hardware interfaces, for example, a web interface, a graphical user interface, and the like. The I/O unit 208 may allow the AI enabled system 200 to interact with through the user devices 104 (not shown in this fig.). Further, the I/O unit 208 may enable the AI enabled system 200 to communicate with other computing devices such as at least one external source 220 or at least one external source, and external databases 222. In a non-limiting example, the at least one external source 220 may be web servers hosting one or more websites of underground utility service providers. In another non-limiting example, the external databases 222 may be one or more geographic databases that include maps and geographic details of different locations. The I/O unit 208 can facilitate multiple communications within a wide variety of networks and protocol types, including wired networks, for example, LAN, cable, etc., and wireless networks, such as WLAN, cellular, or satellite. The I/O unit 202 may include one or more ports for connecting many devices to one another or to another server.

For performing any excavation activity for installation/repair/maintenance of the underground assets, excavators need to know the number of assets of utility services are present beneath the location to be excavated and subsequently need to understand whether any of the assets are risk assets or no-risk assets. To start with, the processor 206 may receive at least one request to excavate a location, from the excavators or an excavating job agency. In one embodiment, the one or more requests (herein after, one or more job requests) comprises location information and a type of excavation job. In one example without limitation, the location information may comprise at least one of a location coordinates, name and/or zip code of the location of the location to be excavated. In another example without limitation, the type of excavation job may indicate a specific area, such a spot region or a street region to be excavated on the location identified by the location information. Further, in other example without limitation, the type of excavation job may also indicate a priority of the excavation job i.e., active job or reactive job. The active job may indicate an excavation job which is currently active and may be processed in a usual/normal manner by the processor 206. On the other hand, a reactive job may indicate an urgent excavation job which must be treated or processed on a high priority basis.

In one exemplary embodiment, to receive the one or more job requests for excavating the location, the processor 206 may automatically check a designated email inbox that may receive one or more emails requesting analysis for a specified location by a requesting agent such as the excavation job agency or the excavators. While checking the designated email inbox, the processor 206 may wait for said emails to be received. In another non-limiting example, the processor 206 may retrieve the one or more job requests from at least one website or a cloud application maintained by the excavating job agency.

Once, the one or more job requests for excavating the location are received, the processor 206 may create or generate a job request corresponding to the one or more job requests and may automatically add the job request in system's database, for tracking, assignment and processing. In one exemplary aspect, the processor 206 may automatically assign a job priority based on type of the job request, i.e., the active job or the reactive job and add the job request in system's database according to the job priority. In one example without limitation, the processor 206 may add a reactive job request early in queue at the system's database such that the reactive job request may be processed on the high priority as compared to the active jobs.

Pursuant to an embodiment, after the one or more job requests are queued up, the processor 206 may access the at least one external source 220 to place a request at the at least one external source 220 for obtaining the at least one underground asset map. In this context, an underground asset map corresponds to an underground asset at the location to be excavated and each of the at least one external source 220 corresponds to a source of the underground asset map. In a non-limiting example, the source may be the one or more websites of one or more utility service providers which provides at least one utility service at the location to be excavated, and the one or more websites of various digging service providers. Examples of the one or more utility service provider websites may include, but not limited thereto, TATA POWER™, NTPC™, Adani Power™, Linesearch BeforeUdig (LSBUD)™, Digdat™, etc.

Precisely, in one non-limiting example, to place the request at least one external source 220, the processor 206 may input the location information of the location to be excavated and the type of the excavation job. The processor 206 may mark the region of interest on at least one interactive map available on the at least one external source 220, based on the location information and/or the type of excavation job. In a non-limiting example, the at least one interactive map is indicative of a geographic map that allows user interactivity such as but not limited to, enable users to zoom in and out, mark an area, etc.

In an illustrative embodiment, to mark the region of interest, the processor 206 may identify that the type of excavation job is the spot region which requires the exact dig location. After identification, the processor 206 may mark a circular region on the interactive map using an available circle drawing tool. The circular region is indicative of the spot region with a center having coordinates indicative of the location coordinates and having a configurable radius. It may be noted that the configurable radius indicates a radius of the circular region that can be configured as per the needs of the excavation job agency or the excavators. Upon marking the region of interest as spot region, the processor 206 may place the request at the at least one external source 220 and receive the at least one underground asset map in response to the request. In an aspect, though the circular region is marked as the region of interest at the interactive map available at the at least one external source 220, it may be noted that the circular region is visually available for use/consumption or reference when the said map is exported and sent back to the field engineers.

In another illustrative embodiment, to mark the region of interest, the processor 206 may identify that the type of excavation job is the street region, after identification, the processor 206 may mark the street region on the interactive map using a polygon/line drawing tool as available on the at least one external source 220. In this context, it may be noted that the street region is one where the possible area of excavation is large and usually a public street. A polygon is usually drawn to mark the boundary of a public street which is accessible to carry out excavation for repair/maintenance/installations of the underground assets. In an aspect, for the street region, the processor 206 may invoke a Street Geometry Processor (SGP) module with the location information (location coordinates as well as street name with zip code and/or a screen shot of the map) and may receive a requisite number of coordinate pairs of the region of interest for drawing it on the interactive maps. In an aspect, the SGP module may receive one or more inputs such as the street name, zip code and location coordinate for the street region. The SGP module may obtain coordinates of boundary of the street region from the one or more geographic databases, such as but non limited thereto, open street maps (OSM) and geographic information system (GIS), based on the location information.

In one non-limiting example, the SGP module utilizes the open street maps [https://learnosm.org/en/osm-data/data-overview/?search=cite] to get the street data in the vicinity of a radius from the location coordinate. To reduce the search space, the street name is used as input to get a match from the open street maps. The SGP module may collect street geometry information and coordinate pair list with the help of street name matching. The SGP module may further utilize computational geometry to arrive at a polygon around street geometry. The SGP module may further smooth the shape of the polygon to have a representation of the boundary of the street region with requisite number of pairs of coordinates to draw the street boundary. The SGP module may return the requisite number of pairs of coordinates of the polygon/line to be drawn as an indication of region of interest on the interactive map. This further reduces the manual efforts needed for drawing the area. The processor 206 may use these requisite number of pairs of coordinates to draw the region of interest on an interactable map on the at least one external source 220 with human in the loop to verify it before submitting the request. In one aspect, though the polygon is marked as the region of interest representing the street boundary at the interactive map available at the at least one external source 220, the polygon is visually available for use/consumption/reference when the said map is exported and sent back to the field engineers.

Once the request is submitted, the at least one external source 220 will share the at least one underground asset map with the region of interest marked on it and supplementary information on an email associated with user-id requesting the map. In an example, the supplementary information may include but not limited thereto, one or more text files, diagrams, images etc. that supports at least one underground asset map.

Some of the at least one external source 220 may allow the at least one underground asset map to be downloaded directly. For those external sources, the processor 206 may directly download one or more map files to corresponding excavation job folders and update the status in a separate status file having information about each underground asset map/supplementary information for each type of excavation job. Precisely, when one or more requests for excavation of the location is received from the excavating job agency, the processor 206 may access the at least one external source 220 based on the location information and download at least one underground asset map based on the location information from the at least one external source 220. Once the at least one underground asset map is downloaded, the processor 206 may mark the region of interest within each of the downloaded underground asset map based on the location information and/or the type of the excavation. To mark the region of interest within each of the downloaded underground asset map, the processor 206 may follow the same process as described above with respect to the marking of the region of interest on at least one interactive map provided at least one external source 220. For the sake of brevity, repetition of the same is avoided.

In one embodiment, the processor 206 may monitor job queue/requests if the each of the at least one underground asset map and respective supplementary files are received from the utility service provider as email attachment. Upon receipt, the processor 206 may download and segregate the map and supplementary files to a job specific folder and mark a status of the download confirmation for each of the at least one underground asset map in the status file. Once all map files are downloaded, the processor 206 may trigger the AI based map processing modelling unit 210 with each of at least one underground asset map to analyze it.

After at least one underground asset map is obtained or downloaded and shared to the AI based map processing modelling unit 210, the AI based map processing modelling unit 210 may analyze each of the at least one underground asset map. During the analysis of each of the at least one underground asset map, the map classification modelling unit 212 may segregate the at least one underground asset map into a map region and a non-map region. The non-map region is indicative of at least one or more of: safety instructions and supplementary information that supports at least one underground asset map. Further the map region may comprise a map area and the text area.

In an exemplary embodiment, the map classification modelling unit 212 may receive at least one underground asset map as a PDF file. Each pdf file has one or more pages from which that need to be segregated as map pages (e. g. the map region) and non-map pages (e. g. the non-map region). As a first step, the map classification modelling unit 212 may utilize a computer vision-based machine learning model to convert the pdf file into multiple image files. In other words, the map classification modelling unit 212 may save each page of the pdf file as a temporary image (jpeg or png) for processing. In a non-limiting example, the computer vision-based machine learning model may be based on a scale-invariant feature transform (SIFT) based feature extraction technique with K-means clustering. However, it is to be noted that any other available computer vision-based machine learning model may be used to serve the intended purpose of the present disclosure. In the next step, the map classification modelling unit 212 may use the SIFT based feature extraction with K-means clustering to have a bag of words representation of each page image. Extracted features are then passed on to a binary classifier model which may be a support vector machine (SVM) and/or Logistic regression model. The map classification modelling unit 212 may classify the extracted features into the map region and non-map region using the binary classifier model. The output probability from this process is used to further enable an effective quality assurance/check if human in the loop is required for any image inspection or classification.

In a non-limiting example, the text analysis modelling unit 214 may identify the name of an underground utility service provider by performing a text-based analysis on a text area of the underground asset map. In another non-limiting example, the text analysis modelling unit 214 may identify the name of underground utility service provider by performing a text-based analysis on the supplementary information and/or the safety instructions associated with the underground asset map. The name of the underground utility service provider is provided as one of the inputs to the warning detection modelling unit 218 for analyzing each of the at least one underground asset map.

Further, the text analysis modelling unit 214 may also analyze text data of one or more emails to extract text that mentions presence of at least one risk asset in the text data, by performing Natural Language processing (NLP) based text analysis. In one non-limiting example, the one or more emails are indicative of a medium of obtaining the at least one underground asset map from the at least one external source 220. Furthermore, the text analysis modelling unit 214 may also analyze the non-map region to detect any variations in the format or patterns of the at least one underground utility which might affect the function of the AI based map processing modelling unit 210.

In yet another exemplary embodiment, the map region identification module 216 may segregate the map area from the map region. To segregate the map area from the map region, the map region identification modelling unit 216 may utilize a pre-trained machine learning model to identify a set of coordinates of a bounding box enclosing the map area in the map region. The map region identification modelling unit 216 may take in map region as input and outputs the set of coordinates for bounding box identifying the map-region. In an example without limitation, the map region identification module 216 may utilize pre-trained machine learning model (e. g. but not limited to Resnet-50, VGG-16 etc.) for feature extraction. The pre-trained model is trained in a transfer learning setting for regression task of bounding box of map region identification. The map region identification modelling unit 216 may crop the map area from the map region upon identification and provide the cropped map area to the warning detection modelling unit 218 for locating the region of interest on the map area.

As a next step, the warning detection modelling unit 218 may receive the name of underground utility service provider from the text analysis modelling unit 214 and the cropped map area from the map region identification modelling unit 216 as an input. Upon receiving the input, the warning detection modelling unit 218 may locate the region of interest within the cropped map area. As previously described, the region of interest corresponds to a specific area (a spot region or street region) within the location to be excavated. In one exemplary embodiment, the warning detection modelling unit 218 may locate the region of interest within the cropped map area by identifying the region of interest marked within the cropped map area of the underground asset map.

Once, the region of interest is located, the warning detection module 218 may extract at least one feature within the region of interest and compare the at least one extracted feature with a plurality of features stored in the repository or database 202 to determine a match. Each of the plurality of features indicates a risk associated with the underground asset corresponding to the identified service provider. As discussed earlier, the repository or internal database 202 maintains a list of the plurality of features corresponding to each of the at least one service provider. In one non-limiting example, the repository or internal database 202 is prepared by cropping each pattern image as identified in a legend region of the at least one underground asset map and storing the cropped images in the repository for each of the at least one service provider. In another non-limiting example, the at least one feature within the region of interest may indicate at least one of a color or patterns of line and tiles representing one or more warnings in the located region of interest.

In response to the determination of the match, the warning detection module 218 may classify the extracted at least one feature as a risk feature corresponding to the identified underground utility service provider and generate one or more warning alerts based on the result of classification. The one or more warning alerts represents presence of one or more risks within the region of interest of the each of the at least one underground asset map. In one illustrative embodiment, the warning detection module 218 is a pre-trained AI model (on large image data for classification or object detection tasks) which is utilized for feature extraction of each map image and corresponding legend images for the utility service. The extracted features are concatenated in an early fusion way and then further processed using a convolution neural network (CNN) followed by binary classification head at the output layer. The warning detection module

218 is trained for the downstream task of binary classification in a one-shot learning paradigm with contrastive loss. The warning detection module 218 uses backpropagation until convergence. At the inference time, the warning detection module 218 takes in the utility name and map image as the input and outputs which all high-risk assets/warnings are present from the comprehensive list of warnings given corresponding legend image. The output of the warning detection module 218 is a text string corresponding to presence of warnings for the input utility map.

In an alternative embodiment, to identify warning in the at least one underground asset maps with patterned regions, it is to be understood that there are some regions which are protected and hence need to be notified explicitly to the excavators, if lying in the vicinity. Such regions in the at least one underground asset maps need to be identified either as contaminated zone or protected sites, represented in a predefined pattern including, but not limited to, dotted or hatched lines. To do so, the warning detection module 218 may implement a deep learning-based pattern matching algorithm which takes a template image as additional input for searching in the utility maps. In one aspect, the output of the deep learning-based pattern matching algorithm is a number representing the closeness of the match. When this number compared with predefined threshold value, it indicates the presence of these protected sites or contaminated regions in the vicinity.

In another aspect, the warning detection module 218 may generate a report for the region of interest by collating the one or more warning alerts for each of the at least one underground asset map corresponding to different identified underground utility service providers. The warning detection module 218 may then bundle the report with the at least one underground asset map marked with region of interest and upload the same to a local or cloud storage. This is followed by a notification in the form of but not limited thereto a text, email etc. to the excavators. In a non-limiting example, the report may be an excel file or a pdf file that indicates the high-risk assets in the region of interest against corresponding utility map names. It may be noted that apart from these formats of the report, the report may be presented in any user-friendly format that serves the intended purpose of indicating the high-risk assets in the region of interest against corresponding utility map names.

Thus, in this manner, the warning detection module 218 may more accurately deduce meaningful insights and provide these in form of the report with the at least one underground asset map for the excavators' consumption before the excavators initiates the excavation at the identified location.

Based on the above, the AI enabled system 200 displays these meaningful insights on Graphical User Interface (GUI), of one or more user device 104, in an interactive manner along with the utility maps for excavators' consumption. The above method thus ensures that the excavators must have all the required information and meaningful insights before them so that they can diligently carry out the excavation without disturbing the underneath utility assets and keep themselves safe from any mishappening. This would significantly reduce the human efforts and time required to attend emergency jobs.

In one embodiment, when bundling of the report with the at least one underground asset map marked with region of interest is completed, the processor 206 may set status of the job request as completed. Thereafter, the bundled report is processed through a quality assurance step where trained human observers check each bundled report for completeness, evaluation of warnings and mark the status of quality check as completed. The processor 206 may check a bundled report completion status and upload the bundled report to the server/cloud storage/Email. This runs in a loop until all the job requests are submitted. The bundled report or 'pack' can be shared on email or otherwise. Further, the bundled report can be accessed through a mobile application for easy visualization and event tracking. In an illustrative embodiment, the AI enabled system 200 may comprise an exception detector unit (not shown in fig.) for detecting an exception thrown by process, bot, or modelling unit during pack processing. The AI enabled system 200 may also comprise an error handler unit (not shown in fig.) for marking the pack for human evaluation upon detection of the exception. Further, the AI enabled system 200 may also comprise a human evaluation module (not shown in fig.) for initiating a human evaluation of the marked pack. The AI enabled system 200 may also comprise a human reviewer interface (not shown in fig.) for presenting the marked pack on the interactive map to a human reviewer and facilitating the evaluation process. Thus, a human-in-the-loop approach for quality check ensures that the pack creation process is safe and allows to have a feedback mechanism to the AI modules in place. Further, the packs can be accessed through a mobile application for easy visualization and event tracking. A time tracking feature to record and display the time spent by field engineers on the mobile application, facilitates efficient tracking of field operations and activities prior to digging operations. The mobile application further comprising a data synchronization feature, facilitating seamless updates of maps, utility types, and supplementary information files between the mobile application and a remote server or database.

Figure 3A:
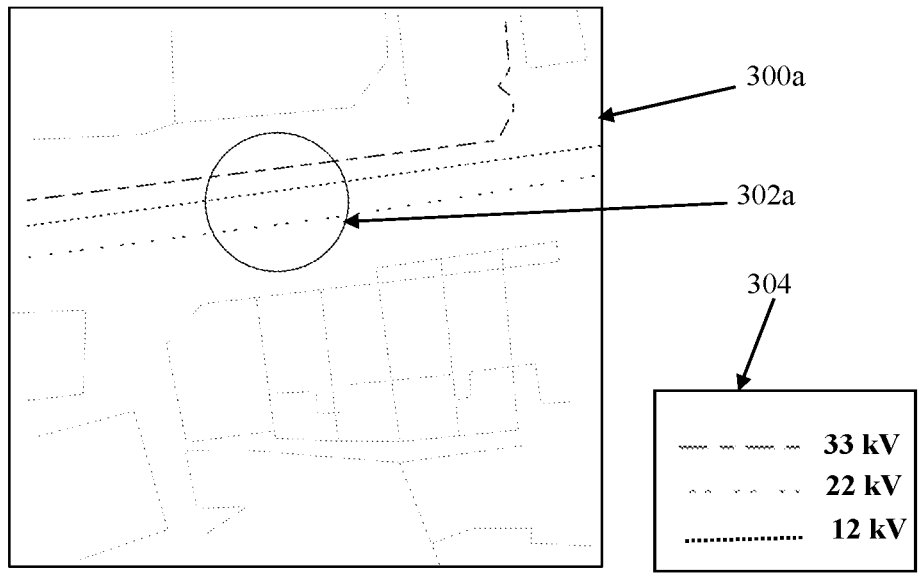
FIGS. 3a and 3b illustrate examples of a spot region and a street region, respectively, in accordance with some embodiments of the present disclosure.
Figure 3B:
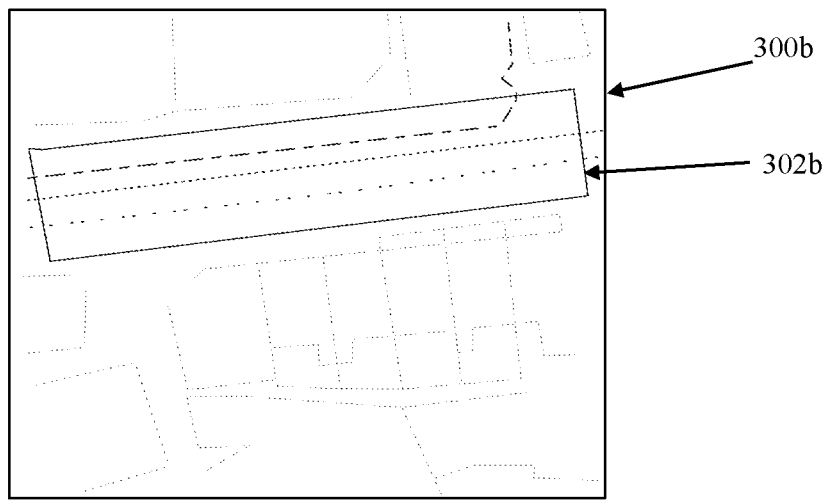

FIGS. 3*a* and 3*b* illustrate examples of a spot region and a street region, respectively. The embodiments described in the above paragraphs may be easily understood by way of following examples in view of the FIGS. 3*a* and 3*b*.

Example 1: Let us suppose that an excavation agency A wants to excavate a particular area in location B to perform maintenance of underground electricity lines/cables. For performing safe excavation, the excavation agency A needs to know which assets of the utility services are present beneath the particular area to be excavated in the location B. To do so, the excavation agency A shares location coordinates such as 28.YYYYY ° N, 77.ZZZZZ ° E of the location B, (including its name 'B', and zip code—246XXX of the location) and indicates an exact dig region such as a spot region which is within 25 m radius from the location coordinates with the AI enabled system 200. Such requests are placed through an email or made available at cloud application maintained by the excavation agency A. The processor 206 utilizes one or more RPA bots or web crawlers to fetch the details of such requests and creates a job request in the systems' database for processing. The processor 206 accesses one or more RPA bots to crawl through the one or more websites of the underground asset map service providers such as Telecom, Energy, Gas, Water, Electricity which provides utility services to the location A identified by the location information and obtains one or more maps for each utility service. The processor 206 marks the spot region on an interactive geographic map and places a request for obtaining one or more maps for each utility service. When the one or more underground asset maps are obtained with the spot region 302*a* marked, the AI based map processing modelling unit 210 separates non map files from the map files. Further, each map file may have a text area (including legend area 304, name of the utility service provider (not shown) etc.) and the map area 300*a*. The AI based map processing modelling unit 210 identifies an underground utility service provider name as "XYZ Power" by performing a text-based analysis on a text area of the map files. The AI based map processing modelling unit 210 also identifies the spot region 302*a* marked within the map area 300*a* corresponding to the XYZ Power dealing with electricity supply. The AI based map processing modelling unit 210 extracts at least one feature or image patches within the spot region and compares the at least one feature or image patches (herein different patterned lines) with a plurality of features or image patches (different patterned lines) already stored corresponding to XYZ Power in a repository to determine a match. The presence of specific pipelines or cables is usually represented by different colors/patterns in different utility maps. Each map contains critical warning which is denoted with a particular-colored or a particular pattern line. In the illustrated example, in the legend area 304 of electricity utility map of XYZ Power, pattern '— — — —' of the line denotes 33 kV High Voltage Cable, pattern '. .  . .  . .' color denotes 22 kV High Voltage Cable, and pattern '▬▬▬▬▬' denotes 12 kV High Voltage Cable. The AI based map processing modelling unit 210 detects the presence of above-mentioned pattern lines in the spot region and generates a warning alert indicating presence of 33 kV High Voltage Cable, 22 kV High Voltage Cable and 12 kV High Voltage Cable corresponding to XYZ Power. A similar analysis may be performed over the one or more underground asset maps e. g. water, natural gas, etc. for other utility service providers that provide the service in the location B to know potential warnings in the spot region 302*a*.

Example 2: Let us suppose that the excavation agency A wants to excavate a particular area in the location B to perform maintenance of underground electricity lines/cables. For performing safe excavation, the excavation agency A needs to know which assets of the utility services are present beneath a particular area to be excavated in the location B. To do so, the excavation agency A shares location coordinates such as 28.YYYYY ° N, 77.ZZZZZ ° E of the location B, (including its name 'B', and zip code-246XXX of the location) and indicates a dig region such as a street region having the location coordinates, street name and/or zip code, with the AI enabled system 200. Such requests are placed through an email or made available at cloud application maintained by the excavation agency A. The processor 206 utilizes one or more RPA bots or web crawlers to fetch the details of such requests and creates a job request in the systems' database for processing. The processor 206 utilizes the one or more RPA bots to crawl through the one or more websites of the underground asset map service providers such as Telecom, Energy, Gas, Water, Electricity which provides utility services to the location A identified by the location information and obtains one or more maps for each utility service. The processor 206 marks a polygon 302*b* indicating a boundary of the street region on an interactive geographic map and places a request for obtaining one or more maps for each utility service. In an aspect, for the street region, the processor 206 invokes the SGP module with the location information (location coordinates as well as street name with zip code and/or a screen shot of the map) and may receive a requisite number of coordinate pairs of the polygon 302*b* from an external geographic database, for drawing it on the interactive maps.

When the one or more underground asset maps are obtained with the street region (the polygon) 302*a* marked, the AI based map processing modelling unit 210 separates non map files from the map files. Further, each map file may have a text area (including legend area 304, name of the utility service provider (not shown) etc.) and the map area 300*a*). The AI based map processing modelling unit 210 identifies an underground utility service provider name as "XYZ Power" by performing a text-based analysis on a text area of the map files. The AI based map processing modelling unit 210 also identifies the street region 302*b* marked as the polygon (almost of rectangular shape) within the map area 300*b* corresponding to the XYZ Power dealing with electricity supply. The AI based map processing modelling unit 210 extracts at least one feature or image patches within the street region and compares the at least one feature or image patches (herein different patterned lines) with a plurality of features or image patches (different patterned lines) already stored corresponding to XYZ Power in a repository to determine a match. The presence of specific pipelines or cables is usually represented by different colors/patterns in different utility maps. Each map contains critical warning which is denoted with a particular-colored or a particular pattern line. In the illustrated example, in the legend area 304 of electricity utility map of XYZ Power, pattern '— — — —' of the line denotes 33 kV High Voltage Cable, pattern '. .  . .  . .' color denotes 22 kV High Voltage Cable, and pattern '▬▬▬▬▬' denotes 12 kV High Voltage Cable. The AI based map processing modelling unit 210 thus detects the presence of above-mentioned pattern lines in the spot region and generates a warning alert indicating presence of 33 kV High Voltage Cable, 22 kV High Voltage Cable and 12 kV High Voltage Cable corresponding to XYZ Power.

A similar analysis may be performed over the one or more underground asset maps e. g. water, natural gas, etc. for other utility service providers that provide the service in the location B to know potential warnings in the street region 302*b*. Though in the illustrated example, the polygon representing the street region has a rectangular geometry, it may be noted that the street region may also have other geometrical shapes which are but not limited thereto, "L", "U", 'Y' etc. Accordingly, the AI based map processing modelling unit 210 may fetch the requisite boundary coordinates of these geometrical shapes from the external geographic database 222 and may process the information to detect one or more warnings in the street region 302*b*.

Figure 4:
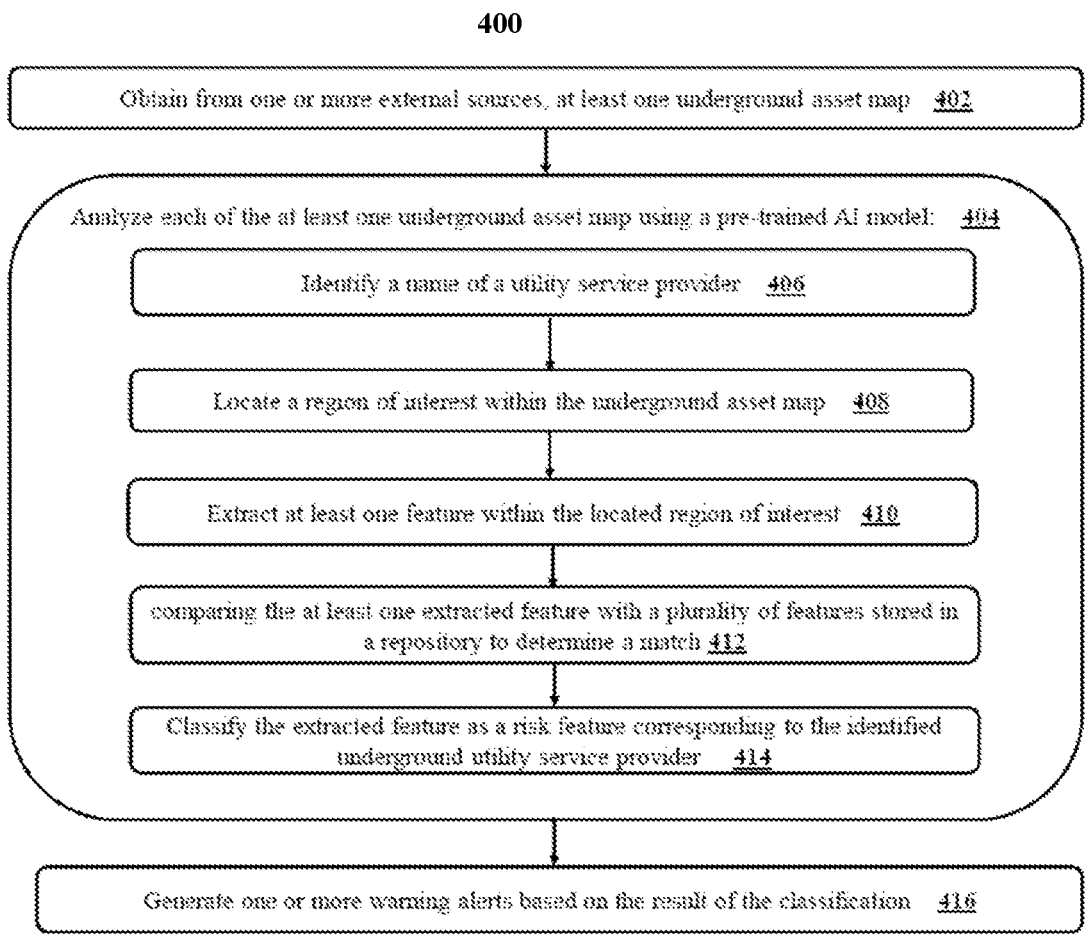
FIG. 4 is a flowchart of a method for generating warning alerts for a location to be excavated, in accordance with an embodiment of the present disclosure.

FIG. 4 is a flowchart of a method for generating warning alerts for a location to be excavated, in accordance with an embodiment of the present disclosure. The order in which the method 400 is described is not intended to be construed as a limitation, and any number of the described method blocks can be combined in any order to implement the method 400 or alternate methods. Additionally, individual blocks may be deleted from the method 400 without departing from the scope of the subject matter described herein. Furthermore, the method can be implemented in any suitable hardware, software, firmware, or combination thereof. However, for ease of explanation, in the embodiments described below, the method 400 may be implemented by the processor 206 and the AI based map processing modelling unit 210 described with reference to FIG. 2.

At step 402, the method may include obtaining, from at least one external source, at least one underground asset map. In one embodiment, an underground asset map corresponds to an underground asset at the location to be excavated. In one implementation, the processor 206 may obtain, at least one underground asset map of the location from at least one external source.

At step 404, the method may include analyzing each of the at least one underground asset map using a pre-trained AI based map processing modelling unit 210. The method may include steps 406 to 414 to analyze each of the at least one underground asset map.

At step 406, the method may include identifying a name of a service provider providing underground service corresponding to the underground asset, by performing a text-based analysis on a text area of the underground asset map. In one implementation, a text analysis modelling unit 214 may identify the name of a service provider providing underground service corresponding to the underground asset.

At step 408, the method may include locating a region of interest within the underground asset map. The region of interest corresponds to a specific area within the location to be excavated. In one implementation, a warning detection modelling unit 218 may locate a region of interest within the underground asset map.

At step 410, the method may include extracting at least one feature within the region of interest of the underground asset map. In one implementation, the warning detection modelling unit 218 may extract at least one feature within the region of interest of the underground asset map.

At step 412, the method may include comparing the at least one extracted feature with a plurality of features stored in a repository to determine a match. Each of the plurality of features indicates a risk associated with the underground asset corresponding to the identified service provider. In one implementation, the warning detection modelling unit 218 may compare the at least one extracted feature with a plurality of features stored in a repository to determine a match.

At step 414, the method may include classifying the extracted feature as a risk feature corresponding to the identified underground utility service provider, in response to the determination of the match. In one implementation, the warning detection modelling unit 218 may classify the extracted feature as a risk feature corresponding to the identified underground utility service provider.

At step 416, the method may include generating one or more warning alerts based on the result of classification, wherein the one or more warnings alerts represents presence of one or more risks within the region of interest of each of the at least one underground asset map. In one implementation, the warning detection modelling unit 218 may generate one or more warning alerts based on the result of classification.

In one embodiment, when bundling of the report with the at least one underground asset map marked with region of interest is completed, the method may include setting status of the job request is set as completed. Thereafter, the method may include processing of the bundled report with a quality assurance step where trained human observers check each bundled report for completeness, evaluation of warnings and mark the status of quality check as completed. The method may include checking a bundled report completion status and uploading the bundled report to the server/cloud storage/Email. This runs in a loop until all the job requests are submitted. The bundled report or 'pack' can be shared on email or otherwise.

In an illustrative embodiment, a method for error processing in a Robotic Process Automation (RPA) system, is provided. The method may include executing a process, bot, or model for processing a pack and detecting an exception thrown by the process, bot, or model during pack processing. The method may further include marking the pack for human evaluation upon detection of the exception. The method may further include initiating a human evaluation of the marked pack. Proceeding further, the method may include evaluating the marked pack by a human reviewer to determine if further processing by a bot is appropriate or if human intervention is required for pack creation. In yet another embodiment, the method may include providing a notification or alert to a human reviewer regarding the pack marked for human evaluation and presenting relevant information and context to the human reviewer for effective evaluation of the pack. Proceeding further, the method may include capturing feedback or decision outcomes from the human reviewer for future reference and process improvement.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed.

Exemplary embodiments as discussed above may provide certain advantages. These advantages are mentioned below.

The embodiments of the present disclosure provide an AI based technique for generating warning alerts for a location to be excavated. This reduces the human intervention in the end-to-end process of retrieving, and analysing maps corresponding to a variety of utility services (such as gas, electricity, water, telecom, etc).

The embodiments of the present disclosure provide an AI based technique that automates mail checking and map download process which reduces the waiting time, processing time and efforts by human operator. It also reduces the chances of human errors of putting the files in wrong pack while handling multiple files/packs.

The embodiments of the present disclosure provide an AI based decisioning, at multiple complex steps of the entire process, that makes the process time and human effort optimized. The human-in-the-loop approach for quality check of created pack ensures the pack creation process is safe and allows to have a feedback mechanism to the AI modules in place.

The embodiments of the present disclosure provide an AI based technique for analysing the received or downloaded map, identifying patterns, co-relating analysed information from multiple maps, and thereby deriving potential warnings in the underground utility maps processes the document in an efficient manner for a specific set of warnings.

The embodiments of the present disclosure provide an AI based technique wherein analyzed summary of the maps used to generate a report of potential warnings for the specified target of excavation co-ordinates, bundled into a pack of artefacts and uploaded to a local or cloud storage, followed by a notification email to the human agents.

The embodiments of the present disclosure provide an AI based technique wherein the generated analysis report bundle (or pack) is accessed by the Field Engineers at the site of excavation via a user-friendly mobile application interface. This also enables monitoring the time spent by field engineers for each map and makes further analytics at the utility service provider's end to measure the adherence to the safety protocols.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively or additionally, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

REFERENCE NUMERALS

| Components/steps | Reference numeral |
| --- | --- |
| System/AI enabled system | 102, 200 |
| Network | 106 |
| User devices | 104-1 to 104-N |
| Internal database | 202 |
| Memory | 204 |
| Processor | 206 |
| I/O unit | 208 |
| AI based map processing modelling unit/ Pre-trained AI based map processing modelling unit | 210 |
| Map classification modelling unit | 212 |
| Text analysis modelling unit | 214 |
| Map region identification modelling unit | 216 |
| Warning detection modelling unit | 218 |
| External source/at least one external source | 220 |
| External databases | 222 |
| Map area | 300a, 300b |
| Spot region | 302a |
| Street region | 302b |
| Legend area/region | 304 |
| Method | 400 |
| Method steps | 402-416 |

We claim:

1. An artificial intelligence (AI) based method for generating warning alerts for a location to be excavated, comprising:
obtaining, from at least one external source, at least one underground asset map, wherein an underground asset map corresponds to an underground asset at the location to be excavated;
analyzing each of the at least one underground asset map using a pre-trained AI model, wherein analyzing each of the at least one underground asset map comprising:
for each of the at least one underground asset map:
identifying, by performing a text-based analysis on a text area of the underground asset map, a name of a service provider providing underground service corresponding to the underground asset;
locating a region of interest within the underground asset map, the region of interest corresponding to a specific area within the location to be excavated;
extracting at least one feature within the region of interest of the underground asset map;
comparing the at least one extracted feature with a plurality of features stored in a repository to determine a match, wherein each of the plurality of features indicate a risk associated with the underground asset corresponding to the identified service provider; and
in response to the determination of the match, classifying the extracted feature as a risk feature corresponding to the identified underground utility service provider; and
generating one or more warning alerts based on the result of classification, wherein the one or more warnings alerts represents presence of one or more risks within the region of interest of each of the at least one underground asset map.

2. The AI based method as claimed in claim 1, wherein obtaining, from the at least one external source, at least one underground asset map comprises:
receiving at least one input request from an excavating job agency, the at least one input request comprises a location information of the location to be excavated and a type of an excavation job, wherein the location information comprises at least one of: the location coordinates, name and zip code of the location, and wherein the type of excavation job is indicative of a spot or a street region to be excavated;
placing, a request for receiving at least one underground map, to the at least one external source, wherein the placing comprises:
inputting the location information of the location to be excavated;
inputting the type of excavation job; and
marking the region of interest on at least one interactive map of the at least one external source based on the location information and/or the type of excavation job; and
receiving, from the at least one external source, at least one underground asset map in response to the request.

3. The AI based method as claimed in claim 2, wherein marking the region of interest based on the type of excavation job on the at least one interactive map, comprises:
identifying the type of excavation job as one of a spot region and a street region;
marking, when the excavation job is identified as the spot region, a circular region with a center having coordinates indicative of the location information coordinates and having a configurable radius, on the interactive map, wherein the circular region is indicative of the spot region; and
obtaining, when the excavation job is identified as the street region, coordinates of boundary of the street region from an external database based on the location information,
marking, when the excavation job is identified as the street region, the boundary of the street region on the at least one interactive map, based on the obtained coordinates.

4. The AI based method as claimed in claim 1, wherein obtaining, from the at least one external source, at least one underground asset map, comprises:
receiving at least one input request from an excavating job agency, the at least one input request comprises a location information of the location to be excavated and a type of an excavation job, wherein the location information comprises at least one of: the location coordinates, name and zip code of the location, and wherein the type of excavation job is indicative of a spot or a street region to be excavated; and
downloading at least one underground asset map from the at least one external source based on the location information and/or the type of excavation job; and
marking the region of interest within each of the downloaded underground asset map based on the location information and/or the type of the excavation,
wherein marking the region of interest further comprises:
identifying the type of excavation job as one of a spot region and a street region,
marking, when the type of excavation job is identified as the spot region, a circular region with a center having coordinates indicative of the location coordinates and having a configurable radius on each of the underground asset map, wherein the circular region is indicative of the spot region, and
obtaining, when the type of excavation job is identified as the street region, coordinates of boundary of the street region from an external database based on the location information,
marking, when the type of excavation job is identified as the street region, the boundary of the street region on each of the underground asset map, based on the received coordinates.

5. The AI based method as claimed in claim 1, wherein analyzing each of the at least one underground asset map using the pre-trained AI model, further comprising:
segregating the at least one underground asset map into a map region and a non-map region, wherein the non-map region is indicative of at least one or more of: safety instructions and supplementary information that supports at least one underground asset map, and wherein the map region comprises a map area and the text area,
wherein segregating the at least one underground asset map into the map region and the non-map region, comprises:
extracting one or more attributes from each of the at least one underground asset map; and
classifying the extracted one or more attributes as one of the map region or the non-map region by performing clustering of the extracted features using K-means clustering.

6. The AI based method as claimed in claim 5, further comprising segregating the map area from the map region of each of the underground asset map, wherein the segregating comprising:
    identifying a set of coordinates of a bounding box enclosing the map area;
    cropping the map area from the map region upon identification; and
    providing the map area to the pre-trained AI model for locating the region of interest within the map area.

7. The AI based method as claimed in claim 1, wherein generating the one or more warning alerts further comprising:
    analyzing text data of one or more emails to identify text that indicates presence of at least one risk asset in the text data, by performing NLP based text analysis,
    wherein the one or more emails are indicative of a medium of obtaining the at least one underground asset map from the one or more external sources.

8. The AI based method as claimed in claim 1, wherein the at least one feature within the located region of interest comprises at least one of a: color or patterns of line and tiles.

9. An artificial intelligence (AI) based system for generating warning alerts for a location to be excavated, comprises:
    a processor configured to obtain, from at least one external sources, at least one underground asset map, wherein an underground asset map corresponds to an underground asset at the location to be excavated; and
    an AI based map processing modelling unit coupled to said processor and configured to analyze each of the at least one underground asset map, wherein to analyze each of the at least one underground asset map, the AI based map processing modelling unit further comprises:
        a text analysis modelling unit configured to identify, by performing a text-based analysis on a text area of the underground asset map, a name of a service provider providing underground service corresponding to the underground asset; and
        a warning detection modelling unit configured to:
            locate a region of interest within the underground asset map, the region of interest corresponding to a specific area within the location to be excavated;
            extract at least one feature within the located region of interest of the underground asset map;
            compare the at least one extracted feature with a plurality of features stored in a repository to determine a match, wherein each of the plurality of features indicate a risk associated with the underground asset corresponding to the identified service provider;
            in response to the determination of the match, classify the extracted feature as a risk feature corresponding to the identified underground utility service provider; and
            generate one or more warning alerts based on the result of classification, wherein the one or more warning alerts represents presence of one or more risks within the region of interest of the each of the at least one underground asset map.

10. The AI based system as claimed in claim 9, wherein to obtain, from the at least one external source, at least one underground asset map, the processor is configured to:
    receive at least one input request from an excavating job agency, the at least one input request comprises a location information of the location to be excavated and a type of an excavation job, wherein the location information comprises at least one of: the location coordinates, name and zip code of the location, and wherein the type of excavation job is indicative of a spot or a street region to be excavated;
    place a request for receiving at least one underground map, to the at least one external source, wherein to place the request, the processor is configured to:
    input the location information of the location to be excavated;
    input the type of excavation job; and
    mark the region of interest on at least one interactive map of the at least one external source based on the location information and/or the type of excavation job; and
    receive, from the at least one external source, at least one underground asset map in response to the request.

11. The AI based system as claimed in claim 10, wherein to mark the region of interest based on the type of excavation job on the at least one interactive map, the processor is configured to:
    identify the type of excavation job as one of a spot region and a street region;
    mark, when the excavation job is identified as the spot region, a circular region, with a center having coordinates indicative of the location information coordinates and having a configurable radius, on the interactive map, wherein the circular region is indicative of the spot region; and
    obtain, when the excavation job is identified as the street region, coordinates of boundary of the street region from an external database based on the location information,
    mark, when the excavation job is identified as the street region, the boundary of the street region on the at least one interactive map, based on the obtained coordinates.

12. The AI based system as claimed in claim 9, wherein to obtain, from the at least one external sources, at least one underground asset map, the processor is configured to:
    receive at least one input request from an excavating job agency, the at least one input request comprises a location information of the location to be excavated and a type of an excavation job, wherein the location information comprises at least one of: the location coordinates, name and zip code of the location, and wherein the type of excavation job is indicative of a spot or a street region to be excavated;
    download at least one underground asset map from the at least one external source based on the location information and/or the type of excavation job; and
    mark the region of interest within each of the downloaded underground asset map based on the location information and/or the type of the excavation,
    wherein to mark the region of interest within each of the underground asset map, the processor is configured to:
    identify the type of excavation job as one of a spot region and a street region;
    mark, when the type of excavation job is identified as the spot region, a circular region, with a center having coordinates indicative of the location information coordinates and having a configurable radius, on each of the underground asset map, wherein the circular region is indicative of the spot region, and
    obtain, when the type of excavation job is identified as the street region, coordinates of boundary of the street region from an external database based on the location information, mark, when the type of excavation job is identified as the street region, the boundary of the street region on each of the underground asset map, based on the obtained coordinates.

13. The AI based system as claimed in claim 9, wherein to analyze each of the at least one underground asset map, the AI based map processing modelling unit further comprises a map classification modelling unit, wherein the map classification modelling unit is configured to:
- segregate the at least one underground asset map into a map region and a non-map region, wherein the non-map region is indicative of at least one or more of: safety instructions and supplementary information that supports at least one underground asset map, and wherein the map region comprises a map area and the text area,
- wherein to segregate the at least one underground asset map into the map region and the non-map region, the map classification model is configured to:
- extract one or more attributes from each of the at least one underground asset map; and
- classify the extracted one or more attributes as one of the map region or the non-map region by performing clustering of the extracted features using K-means clustering.

14. The AI based system as claimed in claim 13, wherein the AI based map processing modelling unit further comprises a map region identification modelling unit configured to segregate the map area from the map region of each of the underground asset map, wherein to segregate the map area from the map region, the map region identification modelling unit is configured to:
- identify a set of coordinates of a bounding box enclosing the map area;
- crop the map area from the map region upon identification; and
- provide the map area to the pre-trained AI model for locating the region of interest within the map area.

15. The AI based system as claimed in claim 9, wherein the at least one feature within the located region of interest comprises at least one of a: color or patterns of line and tiles.

* * * * *